US 6,708,478 B1

(12) United States Patent
Mesmer et al.

(10) Patent No.: US 6,708,478 B1
(45) Date of Patent: Mar. 23, 2004

(54) DEVICE AND PROCEDURE FOR REGULATING THE BALE LENGTH OF A SQUARE BALER

(75) Inventors: Denis Mesmer, Bouzonville (FR); Martin Hawlas, Harsewinkel (DE); Ansgar Nonhoff, Coesfeld (DE); Egbert Scholz, Rheda (DE)

(73) Assignee: Usines CLAAS France, Metz (FR)

( * ) Notice: Subject to any disclaimer, the term of this patent is extended or adjusted under 35 U.S.C. 154(b) by 880 days.

(21) Appl. No.: 09/072,333

(22) Filed: May 4, 1998

(30) Foreign Application Priority Data

May 5, 1997 (DE) .......................... 197 18 831

(51) Int. Cl.[7] ...................... A01D 39/00; A01D 43/02; A01D 75/00
(52) U.S. Cl. ..................... 56/343; 56/432; 100/3; 100/4; 33/773; 33/775
(58) Field of Search ................... 56/341, 343, 432, 56/441, 13.5; 100/88, 3, 7; 33/702, 701, 734, 735, 743, 745, 746, 772, 775, 778, 773

(56) References Cited

U.S. PATENT DOCUMENTS

| 889,225 A | * | 6/1908 | Haas | 33/775 |
|---|---|---|---|---|
| 2,188,201 A | * | 1/1940 | Diedrich | 33/775 |
| 2,735,359 A | | 2/1956 | Tarbox | 100/23 |
| 2,777,384 A | | 1/1957 | Nolt et al. | 100/11 |
| 2,938,451 A | | 5/1960 | Seltzer | 100/4 |
| 3,489,077 A | | 1/1970 | Nolt et al. | 100/19 |
| 4,398,348 A | * | 8/1983 | Bergvall et al. | 33/133 |
| 4,550,504 A | * | 11/1985 | Mehnert | 33/125 C |
| 4,711,078 A | * | 12/1987 | Schaible et al. | 56/341 |
| 4,930,411 A | * | 6/1990 | Naaktgeboren | 100/4 |
| 5,067,249 A | * | 11/1991 | Terrigno | 33/773 |
| 5,115,569 A | * | 5/1992 | Kubo | 33/1 M |
| 5,291,900 A | * | 3/1994 | Lowenstein | 128/774 |
| 5,433,058 A | | 7/1995 | Peterson | 53/399 |
| 5,477,622 A | * | 12/1995 | Skalnik | 33/781 |
| 5,485,682 A | * | 1/1996 | Le Breton | 33/773 |
| 5,631,826 A | * | 5/1997 | Chow | 364/189 |
| 5,783,816 A | * | 7/1998 | McPherson | 250/231.13 |
| 5,855,166 A | * | 1/1999 | McPherson | 100/3 |
| 5,913,801 A | * | 6/1999 | Bottinger et al. | 56/10.2 R |
| 5,943,785 A | * | 8/1999 | Kondo | 33/773 |

FOREIGN PATENT DOCUMENTS

| DE | 34 36 883 A1 | 4/1986 | .......... A01F/15/00 |
|---|---|---|---|
| DE | 38 09 132 C1 | 5/1989 | .......... A01F/15/04 |
| DE | 41 16 619 A1 | 11/1992 | .......... A01F/15/14 |
| DE | 44 42 479 A1 | 6/1995 | .......... A01F/15/08 |
| DE | 295 11 023 U1 | 11/1995 | .......... A01F/15/04 |
| EP | 0 573 342 B1 | 6/1993 | .......... A01F/15/14 |

* cited by examiner

*Primary Examiner*—Árpád Fábián Kovács
(74) *Attorney, Agent, or Firm*—Husch & Eppenberger, LLC; Robert E. Muir; Robert C. Haldiman

(57) ABSTRACT

The invention pertains to a device and procedure to regulate the bale length in a square baler. Sensors determine both the forward and backward movement of the crop bundle and transfer these measurements to an evaluation electronic. The evaluation electronic adds the measurements and triggers the tying process when the actual length value is reached. The procedure includes the steps of: sensing both the forward and backward movement of a crop bundle in a baling chamber; adding the measured forward and backward movements to determine an actual length value of the crop bundle; and triggering the tying device once a pre-set target actual length value is reached.

11 Claims, 2 Drawing Sheets

DEVICE AND PROCEDURE FOR REGULATING THE BALE LENGTH OF A SQUARE BALER

BACKGROUND OF THE INVENTION

This invention relates generally to the field of agricultural machinery, especially balers, and more particularly to improvements in regulating the bale length.

A square baler generally includes a pick-up device, a feeding channel, a baling chamber having side-limiting walls, a baling ram, and a device for tying formed bales. A square baler may also have a device to determine the length of the formed crop bundle. One such device comprises a measuring-wheel and an electronic sensor connected to it.

Such a device is disclosed in German Patent 38 09 132. There is a device described which counts the number of strokes of the baling ram as a measurable variable, temporarily stores the number of strokes, and triggers the tying process to tie the harvested crop bale once the pre-set number of strokes is reached. Hence, the number of strokes is used as a measurement or target for the bale length. This arrangement, however, is inconsistent because the amount of crops (i.e. volume) added with an operating stroke does not in all circumstances equal the path of the baling ram. For example, the loading portion could be a small amount when loading starts, or the bale could expand in the direction of the baling ram when it is moving backwards to allow feeding of the next loading portion. Inconsistent or inaccurate bale lengths can be very disruptive because a bale that is too long may not fit on the transport trailer, and a bale that is too short will only partly utilize the transport volume of the trailer.

The device disclosed in German Patent 34 36 883 shows that it is disadvantageous for the measuring wheel to drive a shift-rod via cams. Because of its drive function, the measuring wheel runs relatively sluggishly and stops when the crop bundle felt by the measuring wheel is incompletely filled in the upper area, and therefore does not transfer sufficient power to turn the counting wheel. In addition, due to the attached gearbox, the measuring wheel cannot be mounted resiliently such as by springs.

To overcome the above disadvantage, the connection of an electronic sensor to the measuring wheel is proposed in European Patent 0 573 342. The installation of teeth in the baling channel which prevent backward movement of the crops is proposed therein, to reconcile inaccuracies which are a result of the forward and backward movement of the bale in the baling channel. This reduces the crop feeding capabilities. Also the crop which is not in the operating area of the teeth, especially the crop in the area around the measuring wheel, nevertheless tends to re-expand so that the measuring device supplies inaccurate or unsatisfactory measuring results.

Finally, German Patent 295 11 023 proposes to count only the movements in feeding direction to attain improved accuracy. However, since the bale re-expands, the measured length is smaller than the actual length.

The present invention is directed to overcoming one or more of the above described deficiencies.

It is an object of the present invention to provide a device and a procedure to regulate, more specifically to measure, the bale length so that the pre-set bale length is most accurately ensured.

SUMMARY OF THE INVENTIION

In accordance with the present invention there is provided a square baler for bailing harvested crops and having a pick-up device, a feeding channel, a baling chamber, a baling ram for forming a crop bundle in the bailing chamber, a tying apparatus for tying the crop bundle and forming a bale, sensing means for sensing both the forward and backward movement of the crop bundle in the bailing chamber; and means responsive to the sensing means for determining the length of the crop bundle and triggering the tying apparatus when a pre-set length for the crop bundle is reached.

The objects are met by introducing an electronic measuring device which measures the forward and backward movement of a crop bundle via the rotational movement of a measuring wheel, then transfers the results to the evaluation electronic, which adds together the measured movements of the crop bundle to an actual-length value and triggers the tying device when the target length-value is approached. On the one hand, the measuring wheel with the attached electronic measuring device can easily be rotated and therefore follows every movement of the crop bundle. On the other hand, by adding-up every forward and backward movement, it is assured that possible errors are precluded by extracting one movement direction, or through the determination of the bale length, on the basis of assumptions of the length measurement.

Also in accordance with the invention there is provided a bailing method for controlling the length of a square bale, comprising the steps of:
  sensing both the forward and backward movement of a crop bundle in a baling chamber; adding the measured forward and backward movements of the crop bundle to determine an actual length of the crop bundle; and triggering a tying device once a pre-set target actual length value is reached to tie the crop bundle into a bale.

BRIEF DESCRIPTION OF THE DRAWINGS

Reference is now made to the drawings which illustrate a preferred embodiment of the invention and of the steps for carrying out the preferred method. The same numerals indicate the same parts throughout the several views.

DETAILED DESCRIPTION

Figure 1:
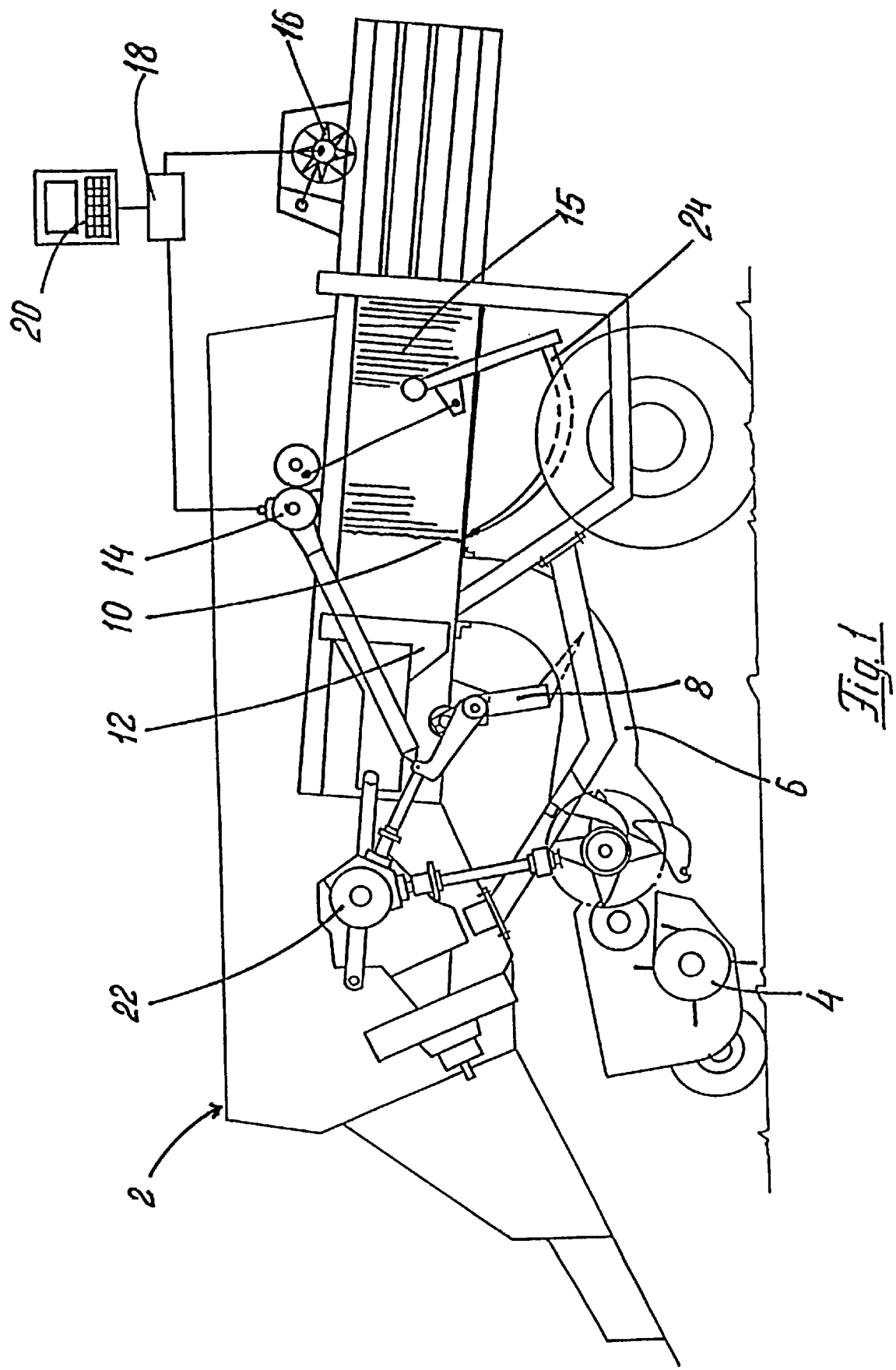
FIG. 1 is a side-elevation of a square baler.

FIG. 1 shows a square baler 2 in side elevation view. Via pick-up device 4, harvested crops are picked-up from the field, transferred into the feeding channel 6, and from here conveyed by a feeder 8 into the baling chamber designated generally by the numeral 10. A baling ram 12 then compresses the conveyed crop to form the start of a crop bundle 15 or presses the conveyed crop against the crop bundle already located in the baling chamber 10. In addition to the baling force which the baling ram 12 creates against the harvested crop bundle 15, additional pivotable sidewalls S create additional baling force to the crop bundle. Once the crop bundle 15 reaches a pre-set length, a tying device 14 is triggered and the bundle is tied-up to form a bale. The completed bale is discharged down a slide onto the field.

The length of the crop bundle 15 is sensed by a pointed-tooth measuring wheel 16. The measuring wheel 16 is connected to an evaluation electronic 18, which may be a microcomputer or a special purpose chip. The evaluation electronic 18 receives the length impulses from measuring wheel 16. The impulses are generated in a manner described below and are added together to determine an actual length-value of the reached length of crop bundle 15. When the actual length value approaches a pre-set target length value which is entered via a terminal 20, the evaluation electronic 18 provides a signal which engages a clutch interconnecting the tying device 14 and a main gearbox 22. The tying device includes a knotter and a twine tying needle 24. The terminal 20 may be remotely positioned, for example on a tractor, and advantageously can exchange data via a CAN-Bus with the evaluation electronic 18. Twine tying needle 24 feeds the twine around crop bundle 15 to the knotter where it is tied and cut. Through this procedure, the finished bale has an actual length very close to the target length value.

Figure 2:
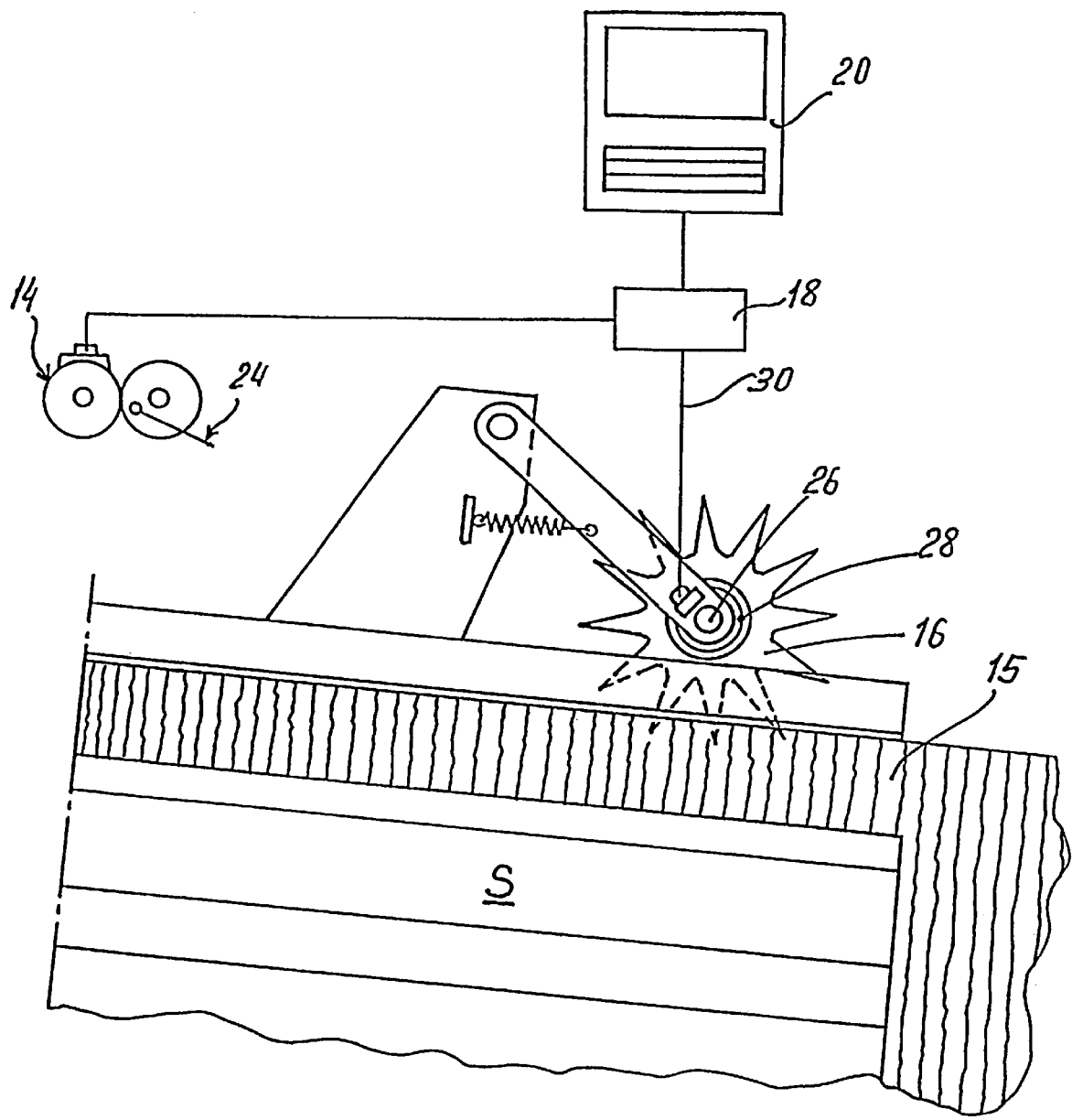
FIG. 2 is a view which is partly detailed and partly schematic of a measuring device embodying the present invention.

FIG. 2 is a detailed view of the measuring wheel 16 which is rotatably mounted on shaft 26. The teeth of the measuring wheel 16 impinge the adjacent crop bundle 15 so that the measuring wheel 16 is driven by the forward and backward movement of the crop bundle 15. A sensor-bearing 28 is used as the bearing and has an impulse ring or an optical viewer to recognize the turning direction and count the number of revolutions of the measuring wheel 16, by measuring the relative angular displacement of the sensor. Alternatively, if a magnetic impulse ring is used for sensing, it is comprised of a series of North and South poles and acts like a ring gear in a magnetic field. The sensor ring, for example, is mounted on the bearing's outer ring. When the inner ring moves, the impulse ring turns past the sensor ring and creates a change in the polarity of the magnetic field. The sensor then issues an impulse, whose frequency depends on the amount of polarity changes per second. With this, it is possible to measure the rotational movement of one ring against the other ring and, in actuality, can sense partial rotations as well. The sensor signal is transferred to the evaluation electronic 18 via a connection cable 30, where it is used to determine the desired information. Instead of the magnetic impulse ring, a so-called incremental transmitter can be used as a sensor bearing. The incremental transmitter, for example, can work with optical grooved-head photo-controls or via a Hall element which picks-up the impulses from the rotational movement and transfers them to the evaluation electronic 18. According to the state-of-the-art, the sensors can be designed for 250 to 500 signals per revolution, depending on the model used. This provides a resulting high accuracy of the acquired actual length values. By using incremental transmitters, the turning direction can be recognized through a phase change of for example 90 degrees. With magnetically-working sensor systems, the turning direction can be recognized from the polarity sequence. Instead of the sensor devices described herein, other sensors known in the art can also be used.

The advantages of the proposed sensor arrangement are the lower susceptibility to disturbances and contamination due to the compact construction, as well as the easy installation and low cost. The integration of the sensor and bearing reduces the amount of parts. By simultaneously sensing and adding the forward and backward movements, the use of surface elements which are supposed to prevent the re-expansion in the baling channel can be avoided without having to accept a lower accuracy.

The sensor signals are electronically evaluated in a method or procedure to determine the length of the crop bundle 15. The proposed procedure ensures that the formed bales do not exceed a pre-set length; even if the first completed bale is the desired length, and even if at first the baling channel is empty and the measuring wheel receives no impulses.

The steps of the method are as follows: sensing both the forward and backward movement of the crop bundle 15 in baling chamber 10; adding the measured forward and backward movements of the crop bundle 15 to determine an actual length value of the crop bundle 15; and triggering the tying device 14 once a pre-set target actual length value is reached.

In regard to the method or procedure, the task can be solved by allowing the sensing means to measure the forward and backward movements of the crop bundle, transferring the sensing data to the evaluation electronic, allowing the evaluation electronic to add together the data for forward and backward movements to an actual length value, and then trigger the tying process when the actual length value approaches the target length value.

With this procedure it is ensured that the tying will be triggered with the highest possible accuracy.

Other objects, advantages and features of the present invention may be perceived by those skilled in the art or from the appended claims.

We claim:

1. In a square baler for baling harvested crops and having a pick-up device, a feeding channel, a baling chamber, a baling ram for forming a crop bundle in the baling chamber, and a tying apparatus for tying the crop bundle and forming a bale; the improvement comprising:
    sensing means including a symmetrical measuring wheel for sensing both forward and backward movements of the crop bundle in the baling chamber;
    means for determining an actual length value of the crop bundle and triggering the tying apparatus when a pre-set length for the crop bundle is reached; and
    the sensing means including an electronic measuring device which measures, via the rotational movement and the direction of rotation of the measuring wheel, the forward and backward movements of the crop bundle in the baling chamber.

2. A square baler according to claim 1, wherein said determining and triggering means is an electronic evaluation device; and wherein the electronic measuring device transfers the measurements of the length of the crop bundle to the electronic evaluation device which adds the sum of the measured movements of the crop bundle to obtain an actual length value of the bale of harvested crops.

3. A square baler according to claim 2, therein said electronic measuring device triggers the tying device when the pre-set length value is approached.

4. A square baler according to claim 1, including a shaft on which the measuring wheel is mounted; and a sensor bearing associated with the shaft and the measuring wheel.

5. A square baler according to claim 4, wherein said sensor bearing is the sensing means for measuring the rotational movement of the measuring wheel.

6. A square baler according to claim 3, including an input terminal associated with the electronic evaluation device and for entering said target length.

7. A square baler according to claim 6, wherein said input terminal is remotely positioned.

8. A baling method for controlling the length of a square bale, comprising the steps of:
    providing a measuring wheel;
    sensing the measuring wheel's rotary movement and direction of rotation and thereby sensing both the forward and backward movement of a crop bundle in a baling chamber;
    adding the measured forward and backward movements of the crop bundle to determine an actual length of the crop bundle;

and triggering a tying device once a pre-set target length value is reached to tie the crop bundle into a bale.

9. A baling method according to claim 8, including providing an electronic evaluation device for performing the step of adding the measured movements.

10. A baling method according to claim 9, wherein said electronic evaluation device performs the step of triggering the tying device once the pre-set target length value is attained.

11. A baling method according to claim 9, wherein after one baling stroke, the electronic evaluation device continually adds the amount that the crop bundle length increased during the first baling stroke to the actual length of the crop bundle and compares the result to the pre-set target length value and, if the pre-set target length value is surpassed by said result, triggers the tying device.

* * * * *